United States Patent
Vieron et al.

(10) Patent No.: US 10,958,945 B2
(45) Date of Patent: Mar. 23, 2021

(54) ELEMENTARY MODULE OF A SYSTEM FOR DISTRIBUTING AN AUDIOVISUAL CONTENT

(71) Applicant: QUORTEX, Cesson-Sevigne (FR)

(72) Inventors: Jérôme Vieron, Cesson-Sevigne (FR); Thierry Trolez, Cesson-Sevigne (FR); Marc Baillavoine, Cesson-Sevigne (FR); Julien Villeret, Cesson-Sevigne (FR)

(73) Assignee: QUORTEX, Cesson-Sevigne (FR)

( * ) Notice: Subject to any disclaimer, the term of this patent is extended or adjusted under 35 U.S.C. 154(b) by 0 days.

(21) Appl. No.: 16/728,491

(22) Filed: Dec. 27, 2019

(65) Prior Publication Data

US 2020/0213628 A1    Jul. 2, 2020

(30) Foreign Application Priority Data

Dec. 28, 2018    (FR) ...................................... 1874299

(51) Int. Cl.
*H04N 21/2183*    (2011.01)
*H04N 21/232*    (2011.01)
(Continued)

(52) U.S. Cl.
CPC ..... *H04N 21/2183* (2013.01); *H04N 21/2326* (2013.01); *H04L 65/60* (2013.01);
(Continued)

(58) Field of Classification Search
None
See application file for complete search history.

(56) References Cited

U.S. PATENT DOCUMENTS 10,148,716 B1 *   12/2018   Joseph ................... G06F 16/16
2016/0380883 A1   12/2016   Shaw et al.
(Continued)

FOREIGN PATENT DOCUMENTS

EP    3 086 510 A1    10/2016

OTHER PUBLICATIONS

Nov. 6, 2019 Search Report issued in French Patent Application No. 1874299.

*Primary Examiner* — James R Marandi
(74) *Attorney, Agent, or Firm* — Oliff PLC; R. Brian Drozd

(57) ABSTRACT

An elementary module of a workflow of a system for distributing audiovisual contents is disclosed. Content is received as a succession of segments which are distributed following a transmission of a request and are obtained by an application of a workflow to a portion of a content. The elementary module executes a processing operation of a predefined type of the workflow and comprises:
- a variable plurality of processing units available for executing the processing operation of the predefined type, the elementary module regularly obtaining information representing each processing unit added to or removed from the plurality,
- an allocation module able to manage allocations or disallocations of processing units of the plurality according to requests for first data received; and
- a load management module able to choose, for each request received, at least one processing unit among the processing units allocated for processing second data in order to obtain first data requested.

13 Claims, 5 Drawing Sheets

(51) Int. Cl.
*H04N 21/2343* (2011.01)
*H04N 21/235* (2011.01)
*H04N 21/24* (2011.01)
*H04N 21/239* (2011.01)
*H04L 29/06* (2006.01)
*H04N 21/20* (2011.01)
*H04N 21/63* (2011.01)
*H04N 21/637* (2011.01)

(52) U.S. Cl.
CPC ......... *H04N 21/20* (2013.01); *H04N 21/2343* (2013.01); *H04N 21/2358* (2013.01); *H04N 21/2393* (2013.01); *H04N 21/23439* (2013.01); *H04N 21/234327* (2013.01); *H04N 21/24* (2013.01); *H04N 21/63* (2013.01); *H04N 21/637* (2013.01)

(56) References Cited

U.S. PATENT DOCUMENTS

| | | | |
|---|---|---|---|
| 2017/0171610 A1* | 6/2017 | Nair | H04N 21/23476 |
| 2019/0166170 A1* | 5/2019 | Ramaswamy | H04N 21/2358 |
| 2020/0137462 A1* | 4/2020 | He | H04N 21/4728 |

\* cited by examiner

ELEMENTARY MODULE OF A SYSTEM FOR DISTRIBUTING AN AUDIOVISUAL CONTENT

TECHNICAL FIELD

The present invention relates to an elementary module intended to be used in at least one workflow of a system for distributing audiovisual contents, a system comprising at least one elementary module and a method executed by an elementary module.

PRIOR ART

The world of television distribution is fundamentally changing. Whereas for a long time users were content with live broadcasting of audiovisual programmes on their television set, methods for consuming audiovisual programmes have fundamentally changed. Thus a user now wishes to be able to watch an audiovisual programme that he has chosen anywhere and at any time. These new consumption methods have been made possible by the appearance of new ever more powerful roaming terminals and by a great increase in network infrastructures.

In parallel with this change, a new audiovisual broadcasting service, referred to as OTT (over-the-top) has appeared. An OTT service is a service for distributing audiovisual contents over a network in which the operator of said network (i.e. a cable, telephone or satellite company) provides only a role of transporting said contents. In an OTT service, the operator of the network has no control over the contents, that is to say he is neither responsible for nor in a position to control the display of said contents, compliance with copyright, and/or redistribution of said contents. OTT services are operated on so-called non-managed networks, that is to say with a bandwidth and quality of service (QoS) that are not guaranteed.

In order to address these new services, various protocols have been developed: Apple HLS (HTTP (Hypertext Transfer Protocol) Live Streaming), Microsoft Smooth Streaming (MSS), Adobe HTTP Dynamic Streaming (HDS), and MPEG Dynamic Adaptive Streaming over HTTP (MPEG-DASH). All these protocols are based on an adaptive transmission concept based on HTTP (HTTP Adaptive Streaming (HAS)). The HAS concept is based on the following functioning:

Each content is encoded in the form of a bitstream according to a plurality of profiles, using various codecs, various resolutions, various bitrates. This plurality of profiles makes it possible to address terminals (or applications functioning on terminals) that have different capacities (supported codecs, screen resolution, decoding power) and to adapt the contents to the variations in bandwidth on the network.

Each bitstream is then divided into segments, referred to as chunks, of a few seconds in accordance with a format dependent on the protocol to be supported. For each content, a file, called a manifest, indicating the characteristics of each profile and the corresponding segments, is created. When a plurality of protocols have to be supported, a version of each segment is created for each protocol.

The manifests and the corresponding segments are stored on servers forming content delivery networks (CDNs), simply referred to as CDNs hereinafter. The CDNs provide cache capacities in the network, which makes it possible to improve the QoS, in particular in terms of access time and latency.

A terminal wishing to play a content sends requests to a CDN. Each request asks for a segment and specifies the profile of the segment asked for. It is therefore the terminal that determines the profile asked for.

A content may therefore be stored in a large number of versions according to the number of profiles and protocols that have to be supported. A system of the HAS type is therefore very greedy in terms of volume of data to be stored.

FIG. 1 depicts schematically an example of a channel 1 broadcasting audiovisual programmes.

The broadcasting channel 1 comprises a source 100, a block referred to as the OTT headend 10, a server, referred to as the original server, 111, and a plurality of CDNs 112A, 112B, 112C and 112D connected to terminals 114A, 114B by means of the interne 113.

The source 100 supplies an original content to the OTT headend 10. In the example in FIG. 1, this content is encoded in the form of a bitstream comprising a video substream, at least one audio substream and at least one subtitle substream.

The OTT headend 10 is responsible for preparing the content in versions in accordance with requirements of terminals that might request this content. The OTT headend 10 comprises a plurality of modules, each module being able to be a physical module (hardware) or software module. In the OTT headend 10, the bitstream is received by a video decoder 101 (and respectively an audio decoder 102 and a subtitle decoder 103) that generates a decoded video stream (and respectively at least one decoded audio stream and at least one decoded subtitle stream).

The decoded video stream is supplied to two image-processing modules 104A and 104B that generate processed video streams. The image-processing module 104A is for example a noise-reducing filtering module. The image-processing module 104B is for example a contour-enhancing module.

Each processed video stream is supplied to two video encoders 107A and 107B. The video encoder 107A is for example an encoder in accordance with the AVC standard (H264/AVC (ISO/IEC 14496-10—MPEG-4 Part 10, Advanced Video Coding)/ITU-T H.264). The encoder 107B is for example an encoder in accordance with the HEVC standard (ISO/IEC 23008-2—MPEG-H Part 2, High Efficiency Video Coding)/ITU-T H.265).

Each decoded audio stream is supplied to two audio-processing modules 105A and 105B that generate processed audio streams. The audio-processing module 105A is for example a noise-reducing filtering module. The image-processing module 105B is for example a voice enhancement module.

Each processed audio stream is supplied to two audio encoders 108A and 108B. The audio encoder 108A is for example an encoder in accordance with the AAC standard (Advanced Audio Coding, ISO/IEC 13818-7). The encoder 107B is for example an encoder in accordance with the MP3 standard (MPEG-1/2 Audio Layer 3).

Each decoded subtitle stream is supplied to a subtitle-processing module 106 that generates processed subtitle streams. The subtitle-processing module 106 is for example a filtering module replacing some words by others according to regional linguistic uses.

Each processed subtitle stream is supplied to a subtitle-format conversion module.

Each video stream coming from the video encoders 107A and 107B, each audio stream coming from the audio encoders 108A and 108B and each subtitle stream coming from the conversion module 109 are transmitted to a packetiser module 110. The packetiser module 110 forms segments in accordance with the protocol or protocols to be supported. Each segment is next transmitted to an original server 111, which is responsible for transmitting these segments to the CDN 112A, 112B, 112C and 112D. Each terminal 114A (or 114B) wishing to play the content requests the content from a CDN segment by segment, changing the profile if necessary from one segment to another.

In the example in FIG. 1, from a content, the OTT headend 10 has generated, assuming that two protocols of the HAS type must be supported, around thirty different versions of the content. The segments corresponding to each version are stored on each CDN.

A concept competing with the HAS concept, known as JIT (just in time), makes it possible to reduce the number of versions to be stored. An application of the JIT concept to the OTT headend 10 would consist of not routinely using all the modules in said block. For example, the OTT headend 10 could stop at the decodings, that is to say at the video decoding by the video coder 101, at the audio decoding by the audio decoder 102 and at the subtitle decoding by the subtitle decoder 103. Next, on request, according to the requirements of the terminal that sent the request, the OTT headend 10 activates certain modules.

The JIT concept may relate to various stages in an audiovisual distribution chain. For example, the JIT concept may be applied to a processing stage (image processing, audio processing, subtitle processing) and/or to an encoding stage (video or audio) and/or to a packetising stage. Thus, for example, a packetising stage may form only segments in accordance with a single protocol. Another application of the JIT concept consists of generating a single version of a content (a single video or audio processing, a single video encoding, a single audio encoding, a single protocol) referred to as the pivot version, and then generating other versions on request from the pivot version, for example by transcoding.

An important limitation of HAS and JIT concepts is that they involve audiovisual data broadcasting systems, known as HAS or JIT systems, that are monolithic and static. Thus these systems have been sized once and for all for processing a predefined maximum number of audiovisual programmes in parallel. These systems cannot go beyond this predefined number. Moreover, the relationships between these various processing modules in these systems are fixed. Each module is thus connected statically with the module that gives it data and the module to which it gives data. Thus, whatever the content and whatever the moment, in order to generate a version of a content according to a given profile, the same modules are systematically instanced and the same predefined workflow is systematically applied.

The monolithic and static aspect means that the workflows are rigid and therefore not open to change. Thus it is very difficult to integrate new functionalities or to replace functionalities in an existing workflow. At best action on the OTT headend for reconfiguring it and at worst a replacement of the OTT headend are necessary.

Architectures of the microservices type in theory make it possible to make the workflows flexible. An architecture of the microservices type is a software architecture in which a complex application or processing operation is broken down into a plurality of independent and weakly coupled processes referred to as microservices. Each microservice usually specialises in a single task. Microservices communicate with each other using APIs (application programming interfaces) such as the REST API (Representational State Transfer). One professed advantage of an architecture of the microservices type is that, if an increase in resources is needed in order to carry out a processing operation, only the microservice or microservices involved in this processing have to be scaled. However, these architectures are still difficult to implement. In addition, they are implemented in systems that are themselves presized. Consequently, although in theory scaling is possible if needed, in reality it is not possible to go beyond the capacities of the system implementing them.

It is desirable to overcome these drawbacks of the prior art. It is in particular desirable to propose a solution for arriving at systems for broadcasting audiovisual data that are non-static and non-monolithic, and that can easily be scaled if needed. Moreover, this solution should make it possible to obtain a system that is highly agile in terms of modification or addition of new functionalities.

DISCLOSURE OF THE INVENTION

One object of the present invention is to propose an elementary module intended to be used in at least one workflow of a system for distributing audiovisual contents stored or produced live by sources to display terminals, each content being received by a terminal in the form of a succession of consecutive files, referred to as segments, each segment being distributed to a terminal following a transmission of a request by said terminal and being obtained by an application of a workflow to a portion of a content, the elementary module executing a processing of a predefined type of the workflow. The elementary module comprises: a variable plurality of processing units available for executing the processing of the predefined type, the elementary module regularly obtaining information representing each processing unit added to or removed from the plurality, each processing unit not keeping any information concerning a processing once the processing has been carried out; a module, referred to as the central module, comprising a communication module: able to receive requests for first data, each request comprising information representing a workflow to be applied to a portion of a content corresponding to a segment requested in a request by a terminal in order to obtain said first data and information representing configuration parameters to be applied to at least one processing unit of said elementary module in order to generate the first data, each processing unit taking into account the information representing the configuration parameters included in a request for first data in order to carry out a processing corresponding to said request for first data; able to transmit a request for second data to a source or to a unit preceding the elementary module in the workflow determined from the information representing the workflow, said second data corresponding to said portion processed or not by one or more units preceding the elementary module in the workflow; and able to transmit first data when they are available to a unit that sent a request for said first data; an allocation module, able to manage allocations and disallocations of processing units of the plurality according to requests for first data received; and a load-management module able to choose, for each request received, at least one processing unit among processing units allocated for processing second data in order to obtain first data requested and launching the processing of the predefined type by each processing unit chosen.

The use of an elementary module according to the invention makes it possible to avoid having a management unit in the distribution system indicating which processing unit must execute a processing operation in the workflow. By receiving the request for first data, the elementary module knows that it must execute a processing operation of the predefined processing type, but the request does not impose on it which processing unit or units must carry out this processing. This is because the elementary module is able itself to determine which processing unit of which it has knowledge must carry out the processing. This aspect makes it possible to obtain a system for distributing audiovisual data that is highly agile, able to use a number of processing units that is variable over time according to its requirements, these processing units belonging to an available set of processing units that it is possible to change over time. Allowing the elementary module to define, for each segment, the processing units to be used and to receive a request for first data describing the workflow makes it possible to use processing units, referred to as state free, that do not keep any information concerning a processing operation once the processing has been carried out. The state-free processing units can pass from one processing operation to another very quickly without the processing operations necessarily concerning the same workflow, the same content or the same display terminal. In addition, the dynamic allocation of the processing units carried out by the allocation module makes it possible not to monopolise processing units unnecessarily and thus to make them available for example for other workflows implemented by other elementary modules. The allocation module allocates only processing units that it needs in order to be certain of executing the processing operations that are requested of it.

According to one embodiment, each processing unit interrogates a database included in the central module in order to obtain configuration parameters corresponding to the information representing configuration parameters before carrying out a processing operation corresponding to a request for first data.

According to one embodiment, the central module comprises a cache memory and the communication module is configured to transmit a request for second data when the first data requested are absent from the cache memory.

Thus it is avoided systematically activating an entire workflow if first data are available in the cache memory of an elementary module.

According to one embodiment, the database comprises configuration parameters fixed independently of a request for first data.

Thus it is possible to enhance a parameterising of each processing unit by parameters that are not represented in a selected profile.

According to one embodiment, the database and each module of the elementary module are co-located on the same item of equipment or completely or partially dispersed over separate items of equipment connected by a communication network.

According to one embodiment, the elementary module comprises an extraction module able to extract the information representing the configuration parameters of each request for first data received.

According to one embodiment, the elementary module comprises means for executing a method of managing the cache memory managing data inputs and outputs of the cache memory.

According to one embodiment, the elementary module comprises a regulation module supplying management rules to the cache-management module, to the allocation module and to the load-management module, the regulation module storing predefined management rules or receiving management rules from an external entity.

According to a second aspect of the invention, the invention relates to a processing method executed by an elementary module executing a predefined type of processing in at least one workflow of a system for distributing audiovisual contents stored or produced live by sources to display terminals, each distribution of content taking place in the form of files, referred to as segments, each segment distributed to a terminal having been the subject of a request transmitted by said terminal and resulting from an application of a workflow to a content portion requested by the request. The method comprises: receiving at least one request for first data, each request comprising information representing a workflow to be applied to a portion of a content corresponding to a segment requested in a request by a terminal in order to obtain said first data and information representing configuration parameters to be applied to at least one processing unit in order to generate the first data; recovering the information representing the configuration parameters contained in said application and transmitting a request for second data to a source or to a unit preceding the elementary module in the workflow determined from the information representing the workflow, said second data corresponding to said portion processed or not by one or more units preceding the elementary module in the workflow; determining whether one or more processing units of the elementary module must be allocated or disallocated and allocating and/or disallocating at least one processing unit when necessary according to the request or requests received; each processing unit belonging to a plurality of processing units available for executing the processing of the predefined processing type, the elementary module regularly obtaining information representing each processing unit added to or removed from said plurality; choosing, for each request, at least one processing unit among the processing units allocated and activating each chosen processing unit so that it applies the predefined type of processing to the second data on reception of the second data, each processing unit taking into account the information representing the configuration parameters corresponding to the processing that it must execute; and, for each application, transmitting the first data when they are available to a unit that sent the request for said first data; each processing unit not keeping any information concerning a processing once the processing has been carried out.

According to one embodiment, each processing unit that has to execute a processing operation requested in a request for first data interrogates a database using the information representing configuration parameters contained in said application in order to obtain configuration parameters corresponding to said information to be applied for said processing operation.

According to one embodiment, the method comprises, for each application, prior to the transmission of an application for second data, checking the presence of the first data in a cache memory of the elementary module; and transmitting the second request when the first data are absent from the cache memory.

According to a third aspect, the invention relates to a system for distributing audiovisual contents stored or produced live by sources to display terminals, each content being received a terminal in the form of a succession of consecutive files, referred to as segments, each segment being distributed to a terminal following a transmission of a request by said terminal and being obtained by an application of a workflow to a portion of a content, at least one workflow implemented by the distribution system comprises at least one elementary module according to the first aspect able to carry out a processing of a predefined type of processing.

According to a fourth aspect, the invention relates to a computer program product comprising instructions for the implementation, by an item of equipment, of the method according to the second aspect by one or more processors of the equipment.

According to a fifth aspect, the invention relates to storage means storing a computer program comprising instructions for the implementation, by an item of equipment, of the method according to the second aspect when said program is executed by one or more processors of said equipment.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

Figure 1:
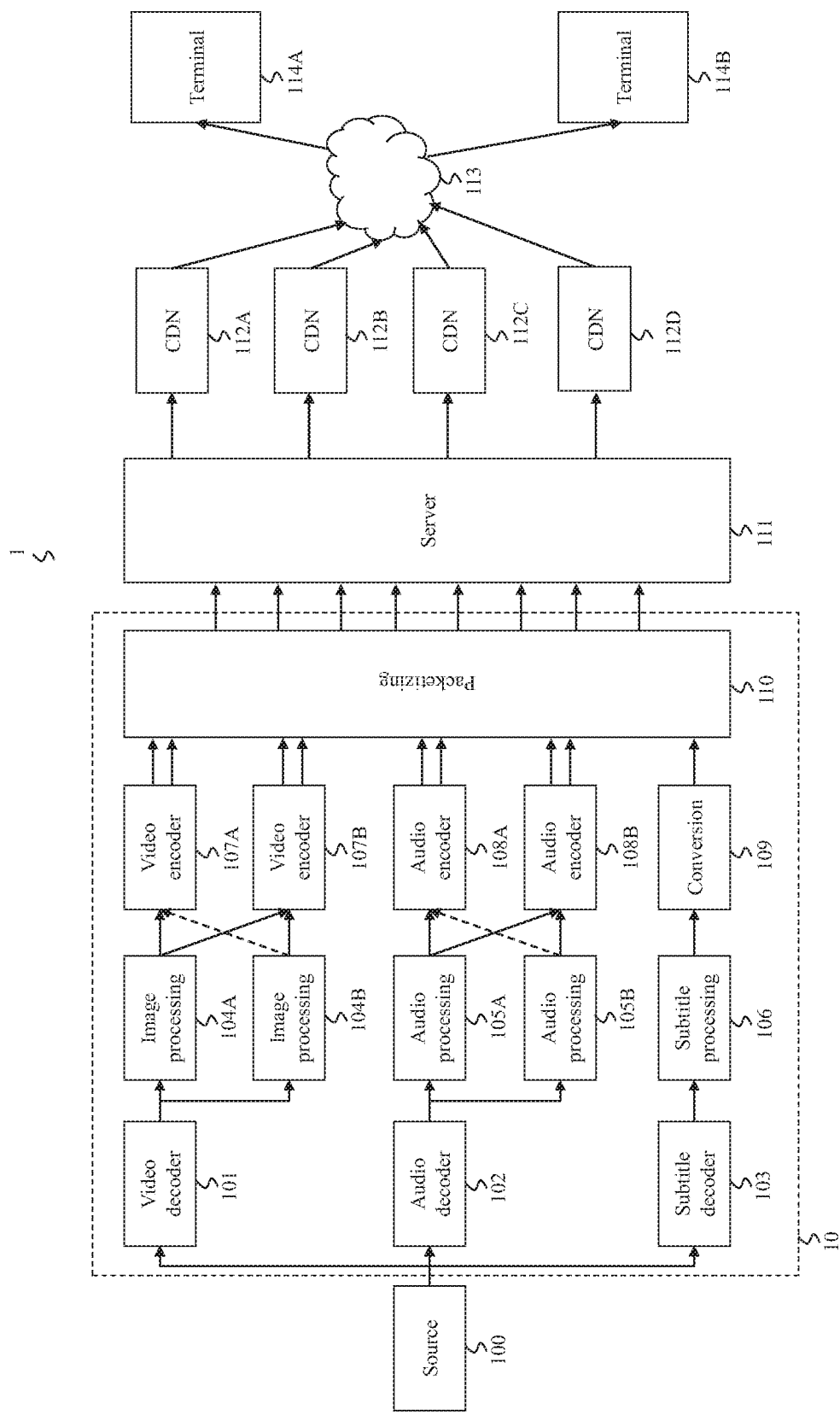
FIG. 1 describes a conventional audiovisual data broadcasting system.
Figure 2A:
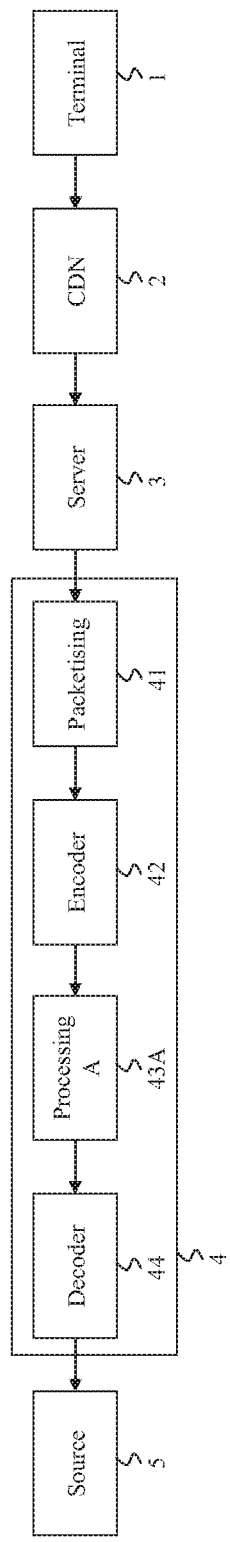
FIG. 2A describes a system for broadcasting audiovisual data at a first instant during the broadcasting.
Figure 2B:
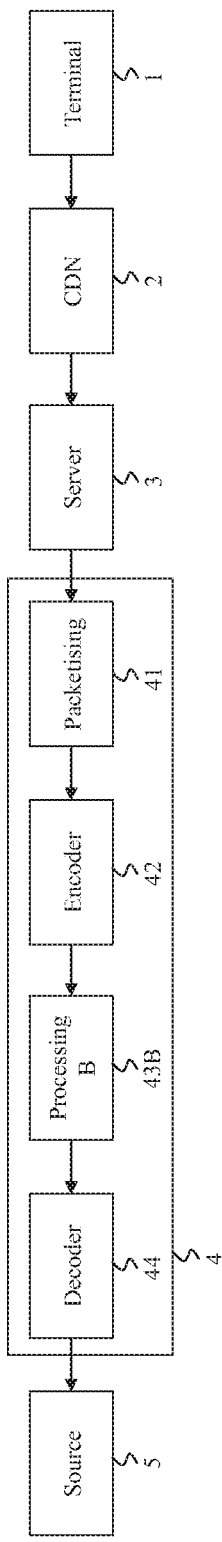
FIG. 2B describes a system for broadcasting audiovisual data at a second instant during the broadcasting.
Figure 2C:
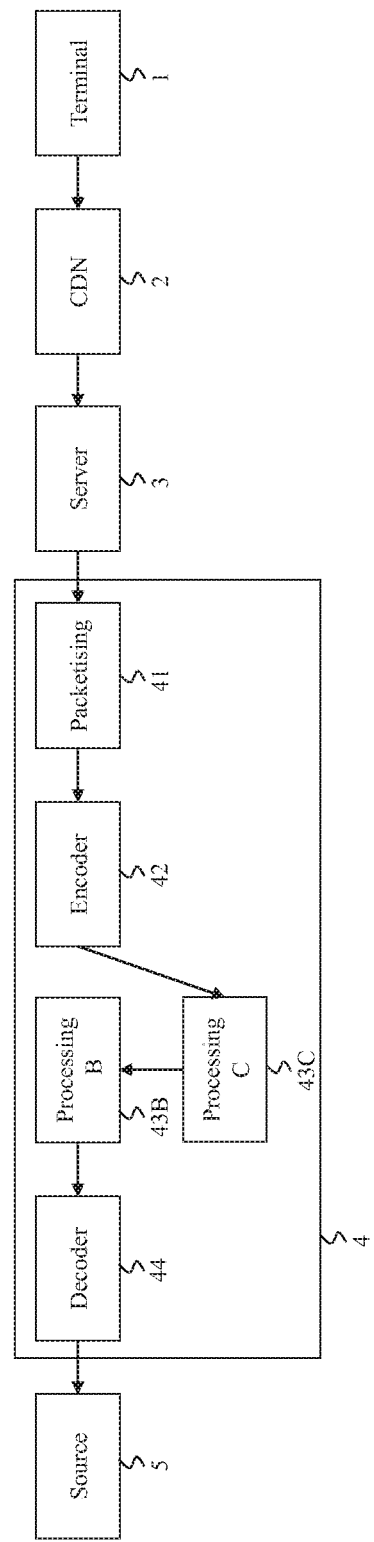
FIG. 2C describes a system for broadcasting audiovisual data at a third instant during the broadcasting.

FIGS. 2A, 2B and 2C describe a development of an audiovisual data distribution system during operation in the case of use of the invention.

At a first instant, corresponding to FIG. 2A, this distribution system comprises a display terminal 1, at least one CDN 2, an original server 3, simply referred to as server hereinafter, a workflow 4 and a source 5. The source 5 comprises at least one audiovisual content, simply referred to as content hereinafter, able to be requested by the terminal 1 according to a particular profile. The workflow 4 comprises a set of processing modules comprising a decoding module 44 able to execute an audio and video decoding, an image-processing module 43A able to apply an image processing A, an encoding module 42 able to carry out an audio and video encoding and a packetising module 41 able to generate segments in accordance with a predetermined protocol. The image processing A is for example a noise-reducing filtering. Each processing module in the workflow 4 may be a software module executed by one or more programmable processing units, or hardware by a dedicated processing unit. The processing modules of the workflow 4 may be co-located geographically and connected for example by a communication bus or dispersed and connected together by a communication network.

In the example in FIG. 2A, the distribution system is in the process of distributing a content. The terminal 1 has fixed a profile and the distribution system supplies segments compatible with this profile. As seen above, for each segment of the content, the terminal 1 sends a request in order to obtain said segment containing information representing the required profile.

As we describe hereinafter, the workflow 4 is defined dynamically for each segment by the terminal 1 or by an intermediate device, which may be the CDN 2 or the server 3. For each segment, each processing module has been chosen from a set of candidate processing modules able to apply exactly the same processing. Thus, although from one segment to another the workflow 4 may apply strictly identical processing operations, each processing operation may be executed by different processing modules. For a processing of a given type, a change of processing module may be caused by a temporary non-availability of a processing module, for example when this processing module is already being used for generating another segment, by malfunctioning of said processing module, by an overload on the computing unit that is to implement said processing module, through a choice of an operator wishing to favour certain processing units rather than others, etc.

At a second instant depicted in FIG. 2B, still during distribution of the content, an operator has for example realised that a quality of the content displayed on the terminal 1 was not sufficient. In this context, an image processing B would be more appropriate than the image processing A. The image processing B is for example a filtering for enhancing contours. In this case, the operator sends for example a command to the terminal 1 so that the terminal 1 generates a request for modifying the workflow 4. Following this command, the image processing module 43A is replaced by an image-processing module 43B implementing the image processing B.

At a third instant, depicted in FIG. 2C, still during distribution of the content, the operator has for example realised that the content is being broadcast fraudulently on unauthorised terminals. In this context, in order to stop this fraud, a processing C of the digital watermarking type is appropriate. In this case, the operator sends for example a command to the terminal 1 so that the terminal 1 generates a request for modifying the workflow 4. Following this parameterising by the operator, a digital watermarking module 43C is added to the workflow 4 between the processing module 43B and the encoding module 42.

The examples described in FIGS. 2A, 2B and 2C show that the invention affords great dynamicity and agility in defining the workflow 4. Thus a different workflow can be defined at each segment. It should be noted that the definition of the workflow is dynamic not only in the choice of the candidate processing module that is to implement such and such a processing, but also in terms of choice of the processing operations to be applied by this workflow.

In one embodiment, each processing module in the workflow 4 is implemented by an elementary module that we describe below in relation to FIGS. 3 and 4. Each elementary module makes available to the workflow one or more processing units for implementing a processing module of the workflow. One role of an elementary module responsible for a processing in a workflow is choosing which processing unit or units from a set of processing units of which it has knowledge must execute said processing. For a given workflow, no processing implemented by an elementary module is executed by a processing unit previously defined in a centralised manner. As we show in the following FIGS. 5 and 6, each request of the terminal 1 for a segment triggers, for each elementary module involved in a processing of the workflow that is to produce this segment, a selection of one or more processing units. From one segment to another, the processing unit or units selected may be different.

Moreover, an elementary module may contribute to a plurality of workflows in parallel, each workflow making it possible to distribute an audiovisual content stored or produced live by a source to a display terminal. An elementary module is therefore not monopolised by a workflow.

Figure 5:
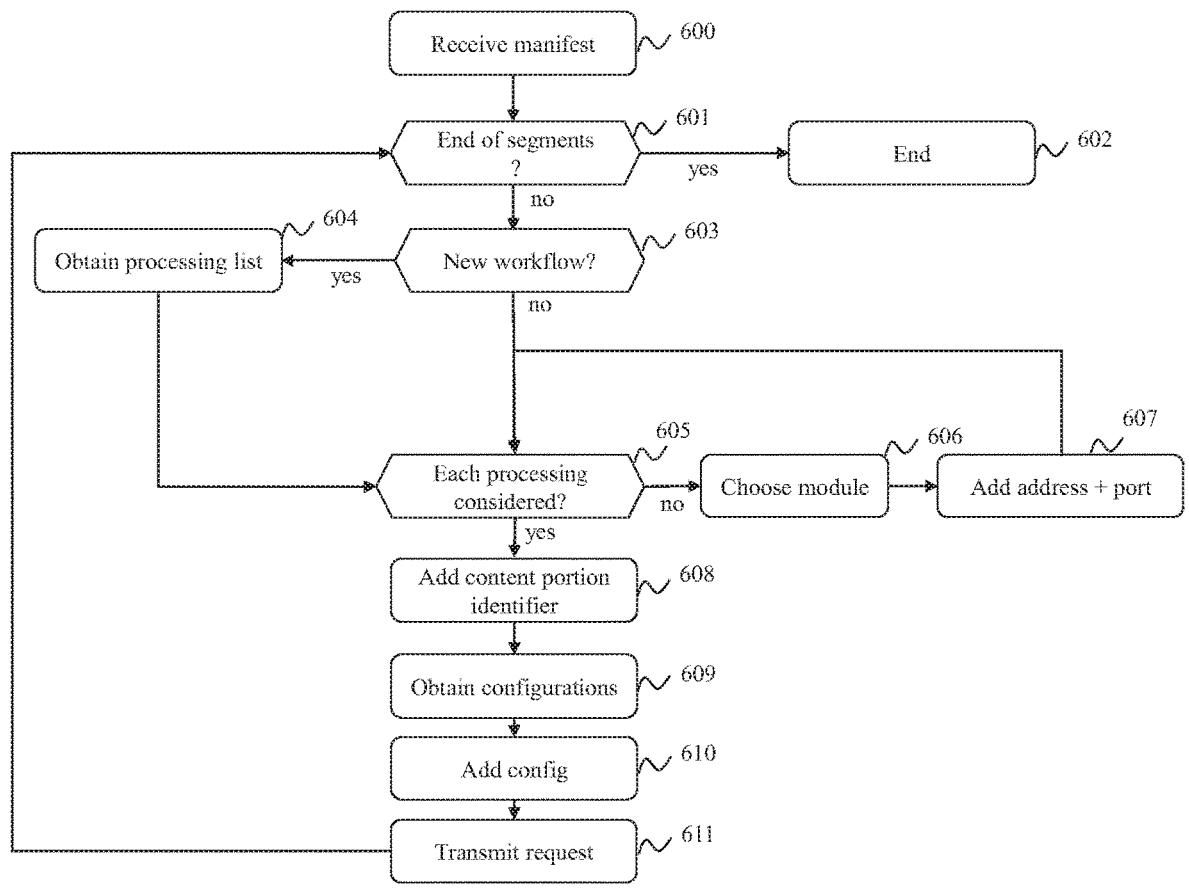
FIG. 5 illustrates schematically a procedure for launching a workflow.

FIG. 5 illustrates schematically steps of a method for activating a workflow so that a terminal can obtain a segment.

According to one embodiment, the method of FIG. 5 is executed by the terminal 1. The method of FIG. 5 enables the terminal 1 to activate a workflow in order to obtain a segment. In one embodiment, the segment requested is in accordance with the HLS protocol and each data transmission, each request and each demand takes place in the form of transmissions of requests in accordance with the HTTP/HTTPS (HTTP Secure) protocol.

Prior to the implementation of the method of FIG. 5, we assume that the terminal 1 has requested a manifest from the CDN 2 concerning a content. In a step 600, the terminal 1 receives a request containing the manifest coming from the CDN 2. This manifest describes each profile that can be requested by the terminal 1.

In a step 601, the terminal 1 determines whether it must continue to play the current content or not, i.e. whether it must request a new segment, referred to as the current segment. This information has for example been supplied by a user of the terminal 1. If the terminal 1 must not continue to play the content, the method ends in a step 602.

Otherwise step 601 is followed by a step 603. During step 603, the terminal 1 determines whether the workflow used for the segment preceding the current segment must be modified. In other words, is it necessary to add, delete or replace a processing operation executed by the workflow 4 in order to obtain the current segment. In one embodiment, at each change of profile, the terminal 1 considers that the workflow 4 must be modified. In step 603, the terminal 1 selects a profile, referred to as the current profile, from the profiles of the manifest according to transmission and processing constraints obtained by the terminal 1. The transmission constraints are for example a bitrate constraint measured by the terminal 1. The processing constraints are for example a display capacity (i.e. a screen resolution) of the terminal 1, a number of images that can be decoded per second, etc. Once determined, the current profile is compared with the profile requested for the segment preceding the current segment. If the two profiles are identical, the terminal 1 executes a step 605. If the two profiles are different or if this current segment is the first segment requested for the content, the terminal 1 executes a step 604.

In step 604, the terminal 1 obtains a list of processing operations representing the workflow to be applied to a portion of the content in order to obtain the current segment. In this embodiment, this list is deduced from the profile selected in step 603. The terminal 1 has for example a lookup table associating each profile that can be requested for a content with a list of processing operations.

Step 604 is followed by step 605. In step 605, the terminal 1 uses either the list of processing operations defined in step 604, or the list of processing operations corresponding to the workflow applied to the segment preceding the current segment. In some embodiment, the list of processing operations used in step 605 is an ordered list in which the processing operations to be applied to the portion of the content in order to obtain the current segment appear in the reverse order in which these processing operations must be applied. For example, if the example in FIG. 2A is taken again, the list of processing operations is as follows:
  packetising in accordance with the HLS protocol;
  encoding in accordance with the AVC standard;
  processing A;
  decoding in accordance with the HEVC standard.

In step 605, the terminal 1 determines whether each processing operation in the list of processing operations has been considered. If not, the terminal 1 runs through the list from the first processing operation seeking the next processing operation not yet considered.

In a step 606, the terminal 1 chooses an elementary module in a set of modules able to execute said processing.

In a step 607, the terminal 1 adds an identifier composed of an address and a port number of the elementary module chosen in a request. Each identifier is written following any identifier or identifiers already present in the request.

Step 607 is followed by step 605, during which the terminal 1 passes to the following processing operation in the list.

When all the processing operations in the lists have been considered, the terminal 1 passes to a step 608. In step 608, the terminal 1 adds to the request information representing the required portion of the content. This information also makes it possible to identify the source storing said content or producing same live.

In a step 609, the terminal 1 obtains, for each processing operation, information representing configuration parameters of the elementary module corresponding to said processing operation, the information representing the configuration parameters that were obtained from in particular the profile selected in step 603.

In a step 610, the terminal 1 adds the information representing the configuration parameters of each module in the request.

Assuming that the workflow to be applied to the current segment is the workflow 23 in FIG. 2A, the request comprises the following sequence:

http://Address1:port1/Address2:port2/Address3:port3/Address4:port4/IDportion?Conf where Address1:port1 (and respectively Address2:port2, Address3:port3, Address4:port4) corresponds to the identifier (the address and the port number) of the module 41 (and respectively the identifier of the module 42, of the module 43 and of the module 44). IDportion corresponds to the information representing the portion of the content. Conf corresponds to the information representing configuration parameters of each module.

In one embodiment, the information Conf takes the following form:

Conf1=NameConf1&Conf2=NameConf2&Conf3=NameConf3&Conf4=NameConf4 where ConfN corresponds to an identifier of an item of information representing configuration parameters of an elementary module N and NameConfN corresponds to a name of the text tile, for example to the JSON (JavaScript Object Notation) or XML (Extensible Markup Language) format, containing the detailed configuration parameters that it will be necessary to apply. In one embodiment, these text files are known to each elementary module.

In another embodiment, the field Conf comprises explicitly each configuration parameter to be applied to an elementary module.

In a step 611, the terminal 1 transmits the request to the first destination elementary module in order to launch the execution of the workflow and thus cause the transmission of the current segment to the terminal 1.

It will be noted that the broadcasting systems described in relation to FIGS. 2A, 2B and 2C comprise a CDN 2 and a server 3 situated between the terminal 1 and the workflow 4. In this case, the request sent by the terminal 1 passes through the server 2 and the CDN 3 without any action by these, which will merely retransmit it.

Figure 3:
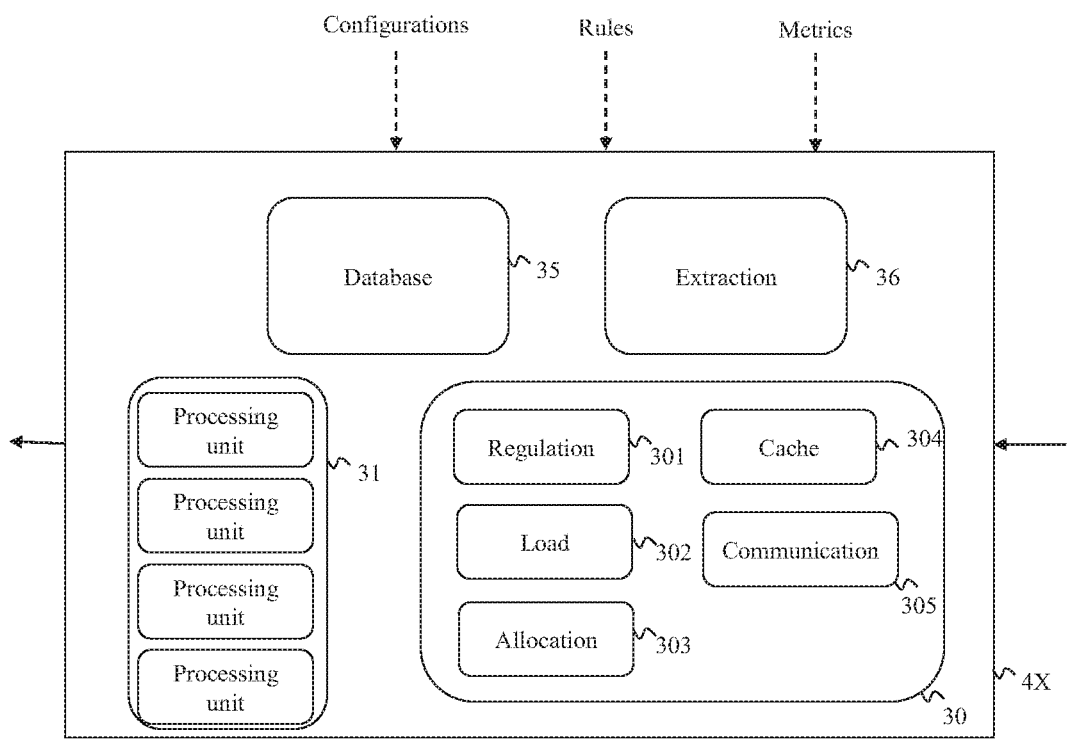
FIG. 3 illustrates schematically an elementary module able to execute a processing operation of a predefined type of a workflow.

It should be noted that the method described in relation to FIG. 3 forms a procedure for launching the workflow.

FIG. 3 illustrates schematically an elementary module 4X able to execute a processing operation of a predefined type of a workflow.

The elementary module 4X in FIG. 3 is for example an elementary module implementing one of the processing modules 41 to 44. If for example the elementary module implements the processing module 41, the type of processing implemented by the elementary module 4X is therefore a packetising in accordance with the HLS protocol.

The elementary module 4X comprises a variable plurality of processing units 31 available for executing the processing operation of the predefined type, the elementary module 4X regularly obtaining information representing each processing unit added to or removed from the plurality. Each processing unit in the plurality is said to be state free, that is to say it does not store any information concerning a processing operation once the processing has been carried out. One advantage of a state-free processing unit is that it can easily pass from one processing operation to another without the successive processing operations concerning the same content, the same workflow or the same terminal.

The elementary module 4X also comprises a central module comprising a communication module 305, an allocation module 303 and a load-management module 302 and a database 35.

The communication module 305 is able to receive requests for first data. A request for first data is for example the request transmitted by the terminal 1 during step 611 when the elementary module 4X implements the processing module 41. When the elementary module implements the processing module 42 (or respectively 43 or 44), a request for first data corresponds to the request transmitted by the terminal 1 in step 611 modified by the elementary module implementing the processing module 41 (or respectively by the elementary modules implementing the processing modules 41 and 42 or by the elementary modules implementing the processing modules 41, 42 and 43) in accordance with a modification procedure described in relation to FIG. 6. In the case where the elementary module 4X implements the processing module 41, the first data correspond to the current segment since the module 41 is the last module in the workflow. The request generated by the terminal 1 therefore requests the current segment from the elementary module 4X. When the elementary module 4X implements the processing module 42 (or respectively 43 or 44), the first data are a result of the processing operations on the content portion corresponding to the identifier IDportion by the processing modules 43 and 44 (or respectively the processing of said content portion by the processing module 44 or said content portion).

As seen above, this request for first data comprises information representing a workflow to be applied to the content portion corresponding to the identifier IDportion in order to obtain the first data and information representing configuration parameters to be applied to at least one processing unit of said elementary module in order to generate the first data. In the case where the elementary module 4X implements the processing module 41, the information representing the workflow (i.e. the sequence Address1:port1/Address2:port2/Address3:port3/Address4:port4) describes the entire workflow. When the elementary module implements the processing module 42 (or respectively 43 or 44), the information representing the workflow describes the workflow as far as the processing module 42 (i.e. Address2:port2/Address3:port3/Address4:port4) (or respectively as far as the module 43 (Address3:port3/Address4:port4) or 44 (Address4:port4)).

The communication module 305 is also able to transmit a request for second data to the source 5 or to a unit preceding the elementary module 4X in the workflow 4 determined from the information representing the workflow. When the elementary module 4X implements the processing module 41, the unit preceding the elementary module 4X is an elementary module implementing the processing module 42. The second data correspond to a result of an application of the processing modules 42, 43 and 44 to the content portion corresponding to the identifierID portion. When the elementary module 4X implements the processing module 42, the unit preceding the elementary module 4X is an elementary module implementing the processing module 43. The second data correspond to the result of an application of the processing modules 43 and 44 to the content portion corresponding to the identifier IDportion. When the elementary module 4X implements the processing module 43, the unit preceding the elementary module 4X is an elementary module implementing the processing module 44. The second data correspond to the result of an application of the processing module 44 to the content portion corresponding to the identifier IDportion. When the elementary module 4X implements the processing module 44, the unit preceding the elementary module 4X is the source 5. The second data correspond to the content portion corresponding to the identifier IDportion.

The communication module 305 is furthermore suitable for transmitting the first data requested to the unit that sent the request for said first data. When the elementary module 4X implements the processing module 41, the unit that sent the request is the terminal 1. When the elementary module 4X implements the processing module 42, the unit that sent the request is the elementary module implementing the processing module 41. When the elementary module 4X implements the processing module 43, the unit that sent the request is the elementary module implementing the processing module 42. When the elementary module 4X implements the processing module 44, the unit that sent the request is the elementary module implementing the processing module 43.

In one embodiment, the communication module 305 is a web server.

The allocation module 303 manages allocations and disallocations of processing units of the plurality according in particular to the requests for first data received by the elementary module 4X.

The load-management module 302 is able to choose, for each request received, at least one processing unit among the processing units allocated by the allocation module 303 and able to launch the processing of the predefined type by each processing unit chosen in order to obtain the first requested data from the second data.

In one embodiment, the database 35 is intended to store text files, for example to the JSON or XML format, each containing detailed configuration parameters corresponding to the information representing the configuration parameters NameConfN contained in the requests for first data.

In one embodiment, the database 35 also stores text files that correspond not directly to the profiles requested by the terminals, but to so-called constraint profiles containing constraint configuration parameters fixed by the external entity independently of a request for first data. These constraint configuration parameters are for example parameters imposed by an operator that do not appear in a profile. For example, these parameters may force a video encoder to function with a restricted number of compression tools.

In one embodiment, the central module 30 comprises a cache memory 304 used for temporarily storing, in accordance with a predefined cache memory management method implemented by a cache-management module, first data generated by the elementary module 4X. The cache memory management method may consist simply of storing each first data item in the cache memory for a predefined period and deleting these first data after this predefined period. In one embodiment, the cache-management module may calculate statistics on the requested contents and adjust the time for which the first data are kept according to these statistics. For example, the method for managing the cache memory may consist of increasing the predefined keeping time for the first data corresponding to highly requested contents and decreasing the keeping time for the first data corresponding to the little-requested contents. In one embodiment, the communication module 305 implements the cache memory management method. In this case, the elementary module 4X does not comprise a cache-management module.

In one embodiment, the elementary module 4X comprises an extraction module 36 able to extract the information representing the configuration parameters of each request for first data received by the elementary module 4X.

In one embodiment, the central module 30 comprises a regulation module 301 supplying cache management rules taken into account in the cache management procedure, allocation rules to the allocation module 303 and load management rules to the load management module 302, the regulation module storing predefined management rules or receiving management rules from an external entity. The cache management rules fix for example the duration of storing the first data in the cache memory 304. The allocation rules for example determine which processing units must be allocated or disallocated as a priority according to criteria of computing capacity, energy consumption or financial cost of use of each processing unit. The load management rules may for example determine when a processing unit is considered to be overloaded and must no longer be solicited for new processing operations.

In one embodiment, the modules 30, 301, 302, 303, 305 and 36, the database 35 and the cache memory 304 are included in a single item of equipment 4Y and connected together by a communication bus. The processing units in the plurality 31 are included in the equipment 4Y or included in other items of equipment connected to the equipment 4Y by a communication network.

Figure 4:
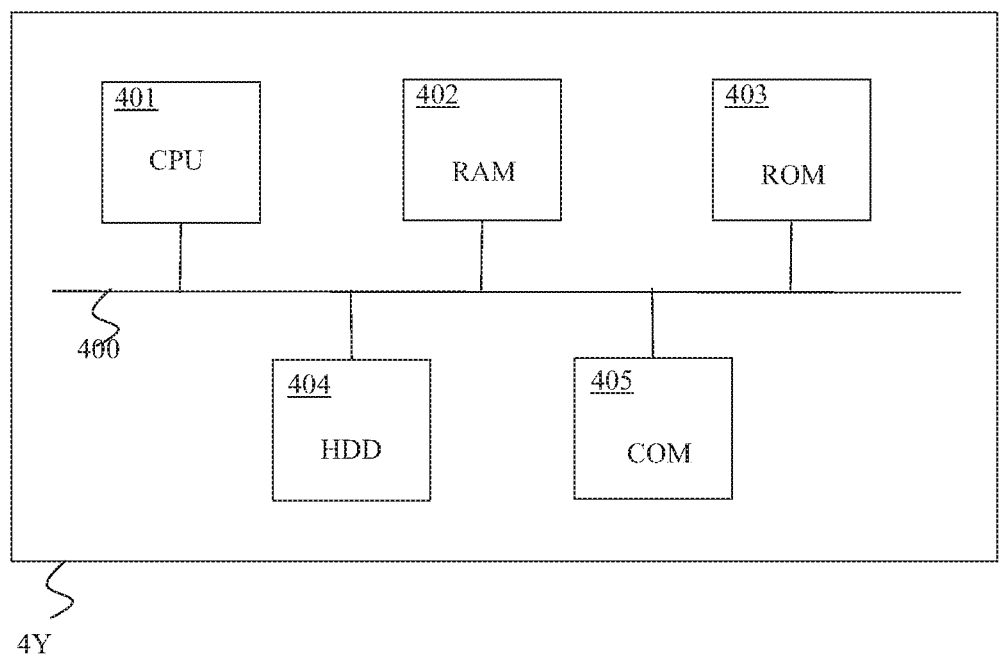
FIG. 4 illustrates an example of hardware architecture of the elementary module used in the context of the invention.

FIG. 4 illustrates an example of hardware architecture of equipment 4Y used in the context of the invention. In the example in FIG. 4, the equipment 4Y implements the modules 30, 301, 302, 303, 305 and 36, the database 35 and the cache memory 304 and comprises certain processing units in the plurality 31.

The equipment 4Y then comprises, connected by a communication bus 400: a plurality of processing units 401; a random access memory RAM 402; a read only memory ROM 403; a storage unit or a storage medium reader, such as an SD card reader 404; a set of communication interfaces 405 enabling the equipment 4Y to communicate with other units in the workflow, i.e. with other elementary modules, with the source 5, the terminal 1 and with other items of equipment. In one embodiment, the storage unit 404 stores the database 35 and the cache memory 304.

Each processing unit in the plurality 401 is capable of executing instructions loaded in the RAM 402 from the ROM 403, for an external memory (not shown), from a storage medium, such as an SD card, or from a communication network. When the equipment 4Y is powered up, each processing unit in the plurality 401 is capable of reading instructions from the RAM 402 and executing them. Each elementary module 4X, the processing of the predefined processing type implemented by the elementary module 4X and the method described hereinafter in relation to FIG. 5 is depicted in the form of instructions forming a computer program. When one or more processing units loads a computer program corresponding to a module (or respectively to a processing operation or to the method described in relation to FIG. 6) it implements said module (or respectively said processing operation or said method).

In one embodiment, each processing unit in the plurality is a physical processor (or logic processor implemented by a physical processor), a microcontroller or a DSP (digital signal processor) loading one of the computer programs.

Figure 6:
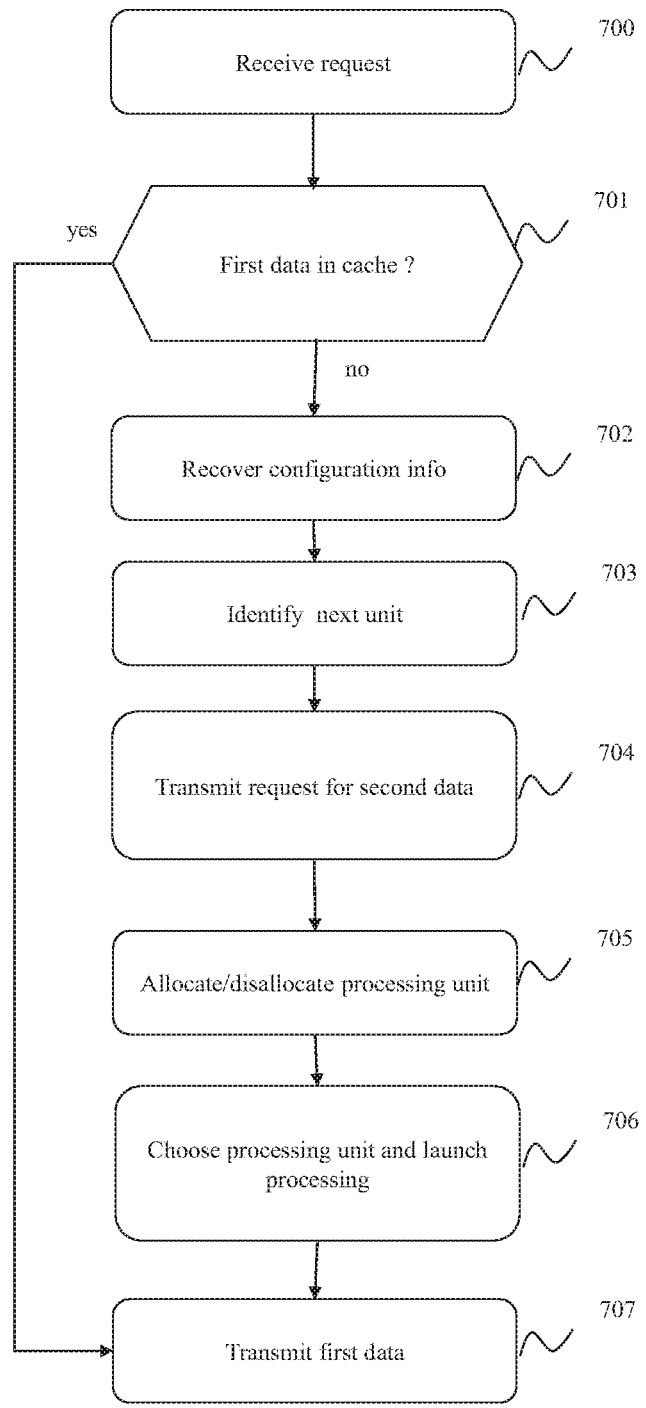
FIG. 6 illustrates schematically a method executed by an elementary module when one or more requests for first data are received.

However, in one embodiment, all or some of the modules, the processing of the predefined processing type or the method described in relation to FIG. 6 may be implemented in hardware form by a machine or a dedicated component, such as an FPGA (field-programmable gate array) or an ASIC (application-specific integrated circuit).

In one embodiment, the modules of the elementary module 4X, the database 35 and the cache memory 304 are dispersed completely or partially over different items of equipment, and connected together by a communication bus when they are on the same item of equipment or by a communication network when they are on different items of equipment.

Hereinafter, in relation to FIG. 6, we describe how an elementary module manages a reception of a request for first data.

FIG. 6 illustrates schematically a method executed by an elementary module on reception of one or more requests for first data.

In a step 700, the communication module 305 of the elementary module 4X receives a request for first data. As seen above, when the elementary module 4X implements the processing module 41, the request for first data corresponds to the request transmitted by the terminal 1 in step 611. However, the communication module 305 of the elementary module 4X may receive a plurality of requests for first data almost simultaneously. For example, when the elementary module 4X implements the processing module 41, the communication module 305 may receive a plurality of requests for first data from a plurality of terminals.

In a step 701, the communication module 305 of the elementary module 4X verifies, for each request for first data received, the presence of said first data in the cache memory 304.

When, for a request for first data, the first data are absent from the cache memory, in one embodiment the extraction module 36 extracts, in a step 702, the information representing the configuration parameters of said request for first data. Since the elementary module 4X does not have the first data available to it, it must be request them. To do this, the communication module 305 transmits a request for second data in a step 704 to the source 5 or to a unit preceding the elementary module 4X in the workflow 4. The module determines, in a step 703, to whom it must transmit the request for second data from the information representing the workflow. In the embodiment described in relation to FIGS. 2A, 3, 4, the unit preceding the elementary module 4X in the workflow is either the source 5 or an elementary module. If the elementary module 4X implements the processing module 41, the elementary module preceding the elementary module 4X in the workflow 4 is an elementary module implementing the processing module 42. As seen above, the request for second data corresponds to a modified version of the request for first data. During the modification, the communication module deletes the identifier of the elementary module 4X from the request for first data. Thus, if the elementary module 4X implements the processing module 41, the request for first data comprises the following sequence:

http://Address1:port1/Address2:port2/Address3:port3/Address4:port4/IDportion?Conf and becomes:

http://Address2:port2/Address3:port3/Address4:port4/IDportion?Conf once modified in order to obtain the request for second data.

In a step 705, the allocation module 303 determines whether one or more processing units in the plurality must be allocated or disallocated and allocates and/or disallocates at least one processing unit when necessary according to the request or requests received. The processing unit or units allocated in step 705 are added to processing units in the plurality already allocated by the allocation module 303. The processing unit or units disallocated in step 705 are subtracted from processing units in the plurality already allocated by the application module 303. To carry out its allocations and disallocations, the allocation module 303 applies an allocation procedure. The allocation procedure consists for example of allocating a first predefined number of processing units when a difference between a number of allocated processing units and a number of active processing units is below a first threshold. Each processing unit is associated with a list of processing operations of the predefined processing type to be carried out, each processing operation in the list corresponding to a request for first data. The processing units allocated that have at least one processing operation in their list are considered to be active. The allocated processing units that do not have any processing operation in their list are considered to be inactive. The allocation procedure consists moreover, for example, of disallocating a second predefined number of processing units when a difference between the number of allocated processing units and the number of active processing units is above a second threshold. Only the inactive processing units can be disallocated. In one embodiment, in order to increase a reactiveness of allocation, the first predefined number is higher than the second predefined number.

In a step 706, the load management module 302 chooses, for each request for first data, at least one processing unit among the processing units allocated for executing the processing of the processing type corresponding to said application. To do this, for example, the load management module 302 chooses the allocated processing units the associated list of processing operations of which contains the fewest processing operations. In another embodiment, the load management module 302 runs through all the processing units in a circular manner and, at each new request for first data, advances by one processing unit in its travel and chooses the processing unit obtained for executing the processing operation corresponding to said request. Each processing unit chosen is activated by the load management module 302 so that it applies the predefined processing type to the second data on reception of the second data. It should be noted that, in one embodiment, prior to the execution of a processing operation corresponding to a request for first data, each processing unit interrogates the database with the information representing the configuration parameters extracted from said request for first data by the extraction module 36 in order to obtain the configuration parameters corresponding to the processing operation that it must execute. Each processing unit chosen for executing a processing operation requested by a request for first data must therefore await the reception of the second data requested in step 704 in order to be able to apply the processing operation of the predefined processing type to said second data in order to obtain said first data.

Step 706 and step 701 are followed by a step 707 during which, for each request for first data, the communication module 305 transmits the first data when they are available to the unit that sent the request for said first data. The unit that sent the request for said first data is either the terminal 1 (when the elementary module 4X implements the processing module 41), or an elementary module (when the elementary module 4X implements the processing module 42 or 43 or 44).

In one embodiment, the extraction module 36 extracts each item of information representing configuration parameters of each request for first data and stores this information in the database 35. Each processing unit in the plurality 31 that is to execute a processing operation interrogates the database in order to obtain said information and next to find the configuration parameters corresponding to this information. Each item of information representing configuration parameters thus stored can be used for statistical purposes.

In one embodiment, the procedure for launching the workflow is executed by the CDN 2 or the server 3. In this case, for each segment, the terminal 1 transmits a request for example in accordance with the HLS protocol in order to obtain said segment and the CDN 2 or the server 3 translates this request into a request in accordance with the invention as for example described in relation to step 610.

In one embodiment, the procedure for launching the workflow is executed by the CDN 2 independently of any request of a terminal. In this embodiment, the CDN 2 anticipates future requests coming from clients. The segments thus obtained are at least temporarily stored by the CDN 2.

In one embodiment, each processing unit in the plurality available for carrying out a processing operation of the predefined type corresponding to an elementary module 4X registers itself with a unit such as a server, referred to as a registration server, with which each elementary module can communicate using a communication network. In this case, for example at regular intervals, each elementary module interrogates the registration server in order to obtain the list of processing units that it could use. In this embodiment, as soon as an elementary module allocates a processing unit in the list stored by the registration server, it informs the registration server of this, which deletes this processing unit from the list.

Up until now, we have envisaged that each processing module in the workflow 4 was implemented by an elementary module. In one embodiment, only some processing modules in the workflow 4 are implemented by an elementary module according to the invention. The other processing modules are implemented by conventional items of equipment of a workflow. When an elementary module must transmit a request for second data to a processing module implemented by a conventional item of equipment, the latter translates its request for second data into a format in accordance with a protocol understood by the conventional item of equipment and transmits the translated request to said conventional item of equipment. When an elementary module receives a request for first data coming from a processing module implemented by a conventional item of equipment, it translates this request for first data into a format in accordance with the format described for example in relation to step 610.

The invention claimed is:

1. An elementary module intended to be used in at least one workflow of a system for distributing audiovisual contents stored or produced live by sources to display terminals, each content being received by a terminal in the form of a succession of consecutive files, referred to as segments, each segment being distributed to a terminal following a transmission of a request by said terminal and being obtained by an application of a workflow to a portion of a content, the elementary module executing a processing of a predefined type of the workflow, wherein the elementary module comprises:
   a variable plurality of processing units available for executing the processing of the predefined type, the elementary module regularly obtaining information representing each processing unit added to or removed from the plurality, each processing unit not keeping any information concerning a processing once the processing has been carried out;
   a module, referred to as the central module, comprising a communication module able to receive requests for first data, each request comprising information representing a workflow to be applied to a portion of a content corresponding to a segment requested in a request by a terminal in order to obtain said first data and information representing configuration parameters to be applied to at least one processing unit of said elementary module in order to generate the first data, each processing unit taking into account the information representing the configuration parameters included in a request for first data in order to carry out a processing corresponding to said request for first data; able to transmit a request for second data to a source or to a unit preceding the elementary module in the workflow determined from the information representing the workflow, said second data corresponding to said portion processed or not by one or more units preceding the elementary module in the workflow; and able to transmit first data when they are available to a unit that sent a request for said first data;
   an allocation module, able to manage allocations and disallocations of processing units of the plurality according to requests for first data received; and
   a load-management module able to choose, for each request received, at least one processing unit among processing units allocated for processing second data in order to obtain first data requested and launching the processing of the predefined type by each processing unit chosen.

2. The elementary module according to claim 1, wherein each processing unit interrogates a database included in the central module in order to obtain configuration parameters corresponding to the information representing configuration parameters before carrying out a processing operation corresponding to a request for first data.

3. The elementary module according to claim 2, wherein the database comprises configuration parameters fixed independently of a request for first data.

4. The elementary module according to claim 2, wherein the database and each module of the elementary module are co-located on the same item of equipment or completely or partially dispersed over separate items of equipment connected by a communication network.

5. The elementary module according to claim 1, wherein the central module comprises a cache memory and wherein the communication module is configured to transmit a request for second data when the first data requested are absent from the cache memory.

6. The elementary module according to claim 1, wherein it comprises an extraction module able to extract the information representing the configuration parameters of each request for first data received.

7. The elementary module according to claim 1, wherein it is configured to execute a method of managing the cache memory managing data inputs and outputs of the cache memory.

8. The elementary module according to claim 7, wherein it comprises a regulation module supplying management rules to the cache-management module, to the allocation module and to the load-management module, the regulation module storing predefined management rules or receiving management rules from an external entity.

9. A system for distributing audiovisual contents stored or produced live by sources to display terminals, each content being received a terminal in the form of a succession of consecutive files, referred to as segments, each segment being distributed to a terminal following a transmission of a request by said terminal and being obtained by an application of a workflow to a portion of a content, wherein at least one workflow implemented by the distribution system comprises at least one elementary module according to claim 1 able to carry out a processing of a predefined type of processing.

10. A processing method executed by an elementary module executing a predefined type of processing in at least one workflow of a system for distributing audiovisual contents stored or produced live by sources to display terminals, each distribution of content taking place in the form of files, referred to as segments, each segment distributed to a terminal having been the subject of a request transmitted by said terminal and resulting from an application of a workflow to a content portion requested by the request, wherein the method comprises:
   receiving at least one request for first data, each request comprising information representing a workflow to be applied to a portion of a content corresponding to a segment requested in a request by a terminal in order to obtain said first data and information representing configuration parameters to be applied to at least one processing unit in order to generate the first data;
   extracting the information representing the configuration parameters contained in said application and transmitting a request for second data to a source or to a unit preceding the elementary module in the workflow determined from the information representing the workflow, said second data corresponding to said portion processed or not by one or more units preceding the elementary module in the workflow;
   determining whether one or more processing units of the elementary module must be allocated or disallocated and allocating and/or disallocating at least one processing unit when necessary according to the request or requests received; each processing unit belonging to a plurality of processing units available for executing the processing of the predefined processing type, the elementary module regularly obtaining information representing each processing unit added to or removed from said plurality;

choosing, for each request, at least one processing unit among the processing units allocated and activating each chosen processing unit so that it applies the predefined type of processing to the second data on reception of the second data, each processing unit taking into account the information representing the configuration parameters corresponding to the processing that it must execute; and, for each application, transmitting the first data when they are available to a unit that sent the request for said first data; each processing unit not keeping any information concerning a processing once the processing has been carried out.

11. The processing method according to claim 10, wherein each processing unit that has to execute a processing operation requested in a request for first data interrogates a database using the information representing configuration parameters contained in said application in order to obtain configuration parameters corresponding to said information to be applied for said processing operation.

12. The processing method according to claim 10, wherein the method comprises, for each application, prior to the transmission of an application for second data, checking the presence of the first data in a cache memory of the elementary module; and transmitting the second request when the first data are absent from the cache memory.

13. A non-transitory storage medium having stored therein; a computer program comprising instructions that, when executed by a processor, performs a processing method, the processing method being executed by an elementary module executing a predefined type of processing in at least one workflow of a system for distributing audiovisual contents stored or produced live by sources to display terminals, each distribution of content taking place in the form of files, referred to as segments, each segment distributed to a terminal having been the subject of a request transmitted by said terminal and resulting from an application of a workflow to a content portion requested by the request, wherein the method comprises:

receiving at least one request for first data, each request comprising information representing a workflow to be applied to a portion of a content corresponding to a segment requested in a request by a terminal in order to obtain said first data and information representing configuration parameters to be applied to at least one processing unit in order to generate the first data;

extracting the information representing the configuration parameters contained in said application and transmitting a request for second data to a source or to a unit preceding the elementary module in the workflow determined from the information representing the workflow, said second data corresponding to said portion processed or not by one or more units preceding the elementary module in the workflow;

determining whether one or more processing units of the elementary module must be allocated or disallocated and allocating and/or disallocating at least one processing unit when necessary according to the request or requests received; each processing unit belonging to a plurality of processing units available for executing the processing of the predefined processing type, the elementary module regularly obtaining information representing each processing unit added to or removed from said plurality;

choosing, for each request, at least one processing unit among the processing units allocated and activating each chosen processing unit so that it applies a predefined type of processing to the second data on reception of the second data, each processing unit taking into account the information representing the configuration parameters corresponding to the processing that it must execute; and, for each application, transmitting the first data when they are available to a unit that sent the request for said first data; each processing unit not keeping any information concerning a processing once the processing has been carried out.

* * * * *